(No Model.)
J. HAIGHT.
UMBRELLA TREE.
No. 407,927. Patented July 30, 1889.
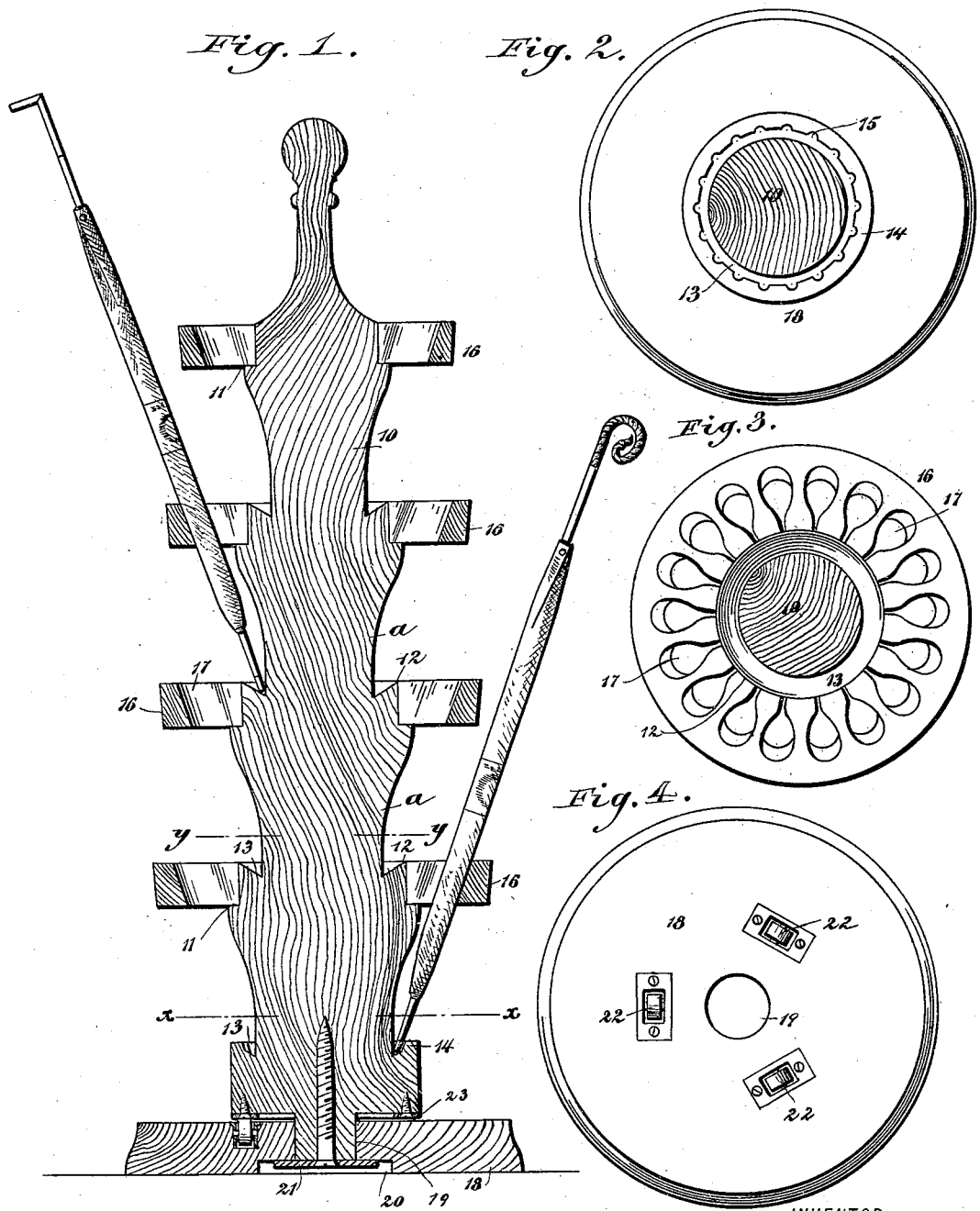
WITNESSES:
INVENTOR:
J. Haight
BY Munn &Co.
ATTORNEYS.

UNITED STATES PATENT OFFICE.

JONATHAN HAIGHT, OF PITTSFIELD, MASSACHUSETTS.

UMBRELLA-TREE.

SPECIFICATION forming part of Letters Patent No. 407,927, dated July 30, 1889.

Application filed February 9, 1889. Serial No. 299,292. (No model.)

*To all whom it may concern:*

Be it known that I, JONATHAN HAIGHT, of Pittsfield, in the county of Berkshire and State of Massachusetts, have invented a new and useful Improvement in Umbrella-Trees, of which the following is a full, clear, and exact description.

My invention relates to an improvement in umbrella-trees, and has for its object to provide a device whereby a number of umbrellas may be rigidly held in such position as to present an attractive appearance, and wherein a major portion of the umbrellas will be visible.

A further object of the invention is to provide a tree which will be firm, substantial, ornamental, and capable of being revolved, whereby the umbrellas upon any side may be made to face, when desired, in a given direction.

The invention consists in the novel construction and combination of the several parts, as will be hereinafter more fully set forth, and pointed out in the claims.

Reference is to be had to the accompanying drawings, forming a part of this specification, in which similar figures of reference indicate corresponding parts in all the views.

Figure 1 is a central vertical section through the tree. Fig. 2 is a transverse section on line $x$ $x$ of Fig. 1. Fig. 3 is a similar section on line $y$ $y$ of Fig. 1, and Fig. 4 is a plan view of the base detached.

In carrying out the invention the body 10 of the tree is constructed of wood, metal, or other suitable material, either hollow or solid, and the outer face of the said tree is turned or otherwise manipulated to produce a series of shoulders 11, the shoulders being arranged one above the other at a suitable distance apart, which shoulders graduate in size from the bottom upward, the lowest shoulder being the largest. Above each shoulder 11 a second shoulder 12 is formed by reducing the body of the tree, as illustrated at $a$ in Fig. 1. The upper face of the shoulder 12 is provided with a V-groove 13, ordinarily extending from the periphery of the said shoulder 12 inward and downward to the body of the tree, as illustrated in Fig. 3 and the upper portion of Fig. 1, and near the base of the tree, below the lower shoulder 11, a shoulder 14 is formed provided with a V-groove 13, as has been described in connection with the shoulders 12.

Instead of carrying the groove from the periphery of the shoulders downward, as shown in Fig. 3, the inclined wall of the groove may be made to commence at a point within the periphery, as shown in the base-shoulder 14, and in Fig. 2. When this latter construction is employed in the inclined wall of the groove, a series of cavities 15 are produced, each cavity being adapted to receive a ferrule of an umbrella.

The upper shoulder 11 of the tree is not provided with a second grooved shoulder above it; but the surface of the tree is carried upward to terminate in any suitable ornament. Upon each of the shoulders 11 a disk 16 is made to rest, the lower disk being the largest and the others gradually reduced in size as they approach the top of the tree. The disks 16 are rigidly attached to the tree and the top of the disks are made to horizontally align the upper surface of the grooved shoulders 12.

In the disks 16 a series of diametrical essentially oval-shaped openings 17 are formed, the outer wall of each of which openings inclines from the periphery of the disk in the direction of the vertical axis of the tree, as illustrated in Figs. 1 and 3. The several openings 17 are purposed to receive an umbrella and give the same, when placed in position, an inclination upward and outward.

When the cavities 15 are formed in the shoulder-grooves 13, one cavity is formed for each opening beneath the same, and in placing the umbrellas in position after having been passed through the openings 17 of the disks the umbrellas are made to enter the groove 13 immediately below, and if the grooves contain cavities the ferrule of each umbrella is brought in contact with the outer wall of the same. By this arrangement it will be observed that the umbrellas are arranged at an outward inclination from the tree, one set above the other, and that almost the entire portion of the umbrellas of the lower set is exposed to view, while the major portions and the handles of the sets above the base set of umbrellas are rendered plainly visible.

The tree 10 is usually mounted in a base 18, said base being provided, to that end, with a central aperture 19 to receive a stud projected downward from the bottom of the tree.

In the bottom face of the base, around the central aperture 19 therein, a rabbet 20 is formed, in which rabbet a plate 21 is introduced, properly secured to the bottom of the tree by a screw or equivalent device, as illustrated in Fig. 1. In the top of the base, around the aperture 19, a series of vertical rollers 22 are arranged upon a concentric line, said rollers being countersunk in the base in such manner that they will project but slightly above the same. These rollers 22 are adapted to travel upon the bottom surface of the tree. In order that the said surface may not be worn by contact with the rollers, a metal ring 23 is usually countersunk in the said bottom surface of the tree for contact with the said rollers, as shown in Fig. 1.

It is obvious that while I have described the tree as being adapted for the reception of umbrellas the same may be employed to exhibit canes, whips, or similar articles with equally satisfactory results.

Having thus described my invention, I claim as new and desire to secure by Letters Patent—

1. In an umbrella-tree, the combination, with a vertical body having a series of graduated disks attached thereto, provided with a series of openings therein, and a groove above the lower bearing-surface of each of the said disks, of a base in which the body of the tree is pivotally secured, whereby the said body may be revolved upon the said base, substantially as shown and described.

2. The combination, with a body provided with a series of shoulders graduated in diameter from the base upward and a second series of shoulders having a groove produced in the upper face, of disks secured upon the first-named shoulders, provided with a series of openings therein having inwardly-inclined outer walls, substantially as shown and described.

3. The combination, with a body provided with a series of shoulders graduated in diameter from the base upward and a second series of shoulders having a groove produced in the upper face, of disks secured upon the first-named shoulders, provided with a series of openings therein having inwardly-inclined outer walls, and a base containing vertical rollers, in which the said body is pivotally held, substantially as shown and described.

4. The combination, with a vertical body provided with a series of graduated shoulders 11, and reduced shoulders 12 above the same, having a groove produced in the upper face, and a base grooved shoulder at or near the lower end, of a series of disks 16, supported upon the shoulders 11, having a series of openings therein, all combined for operation substantially as shown and described.

5. The combination, with a vertical body provided with a series of graduated shoulders 11, reduced shoulders 12 above the same, having grooves therein provided with vertical cavities in the upper wall, and a base-shoulder 14, of a series of graduated disks supported upon the shoulders 11, provided with a series of diagonal openings, and a base-plate having friction-rollers, in which the body is pivotally secured, substantially as shown and described.

JONATHAN HAIGHT.

Witnesses:
  E. H. KENNEDY,
  W. E. DAY.